United States Patent
Kreuger

(10) Patent No.: US 9,989,278 B1
(45) Date of Patent: Jun. 5, 2018

(54) SOLAR ENERGY COLLECTOR AND/OR CONCENTRATOR, AND THERMAL ENERGY STORAGE AND RETRIEVAL SYSTEM INCLUDING THE SAME

(71) Applicant: Sten Kreuger, Chonburi (TH)

(72) Inventor: Sten Kreuger, Chonburi (TH)

(*) Notice: Subject to any disclaimer, the term of this patent is extended or adjusted under 35 U.S.C. 154(b) by 0 days. days.

(21) Appl. No.: 15/424,424

(22) Filed: Feb. 3, 2017

Related U.S. Application Data

(60) Provisional application No. 62/290,898, filed on Feb. 3, 2016.

(51) Int. Cl.
| F24J 2/00 | (2014.01) |
| F24J 2/08 | (2006.01) |
| F24J 2/34 | (2006.01) |
| F24J 2/04 | (2006.01) |
| F24J 2/06 | (2006.01) |

(52) U.S. Cl.
CPC .......... *F24J 2/0015* (2013.01); *F24J 2/0483* (2013.01); *F24J 2/06* (2013.01); *F24J 2/08* (2013.01); *F24J 2/34* (2013.01)

(58) Field of Classification Search
CPC .. F24J 2/0015; F24J 2/0483; F24J 2/06; F24J 2/34; F24J 2/08; F24J 2/085
USPC ....................................................... 126/678
See application file for complete search history.

(56) References Cited

U.S. PATENT DOCUMENTS

| 3,985,118 A * | 10/1976 | Bard .......................... F24J 2/08 126/575 |
| 3,991,741 A * | 11/1976 | Northrup, Jr. ............. F24J 2/08 126/578 |
| 4,054,124 A | 10/1977 | Knoos |
| 4,058,110 A | 11/1977 | Holt |
| 4,134,393 A * | 1/1979 | Stark .................... B01D 5/0066 126/581 |
| 4,262,657 A | 4/1981 | McCullough et al. |
| 9,541,071 B2 * | 1/2017 | Kroizer .................. F03G 6/065 |
| 2008/0156317 A1* | 7/2008 | Yangpichit .............. F03D 9/007 126/698 |
| 2009/0250094 A1* | 10/2009 | Robison ..................... F24J 2/06 136/246 |
| 2010/0212660 A1* | 8/2010 | Schilder .................. F24J 2/067 126/651 |

(Continued)

*Primary Examiner* — David J Laux
(74) *Attorney, Agent, or Firm* — Andrew D. Fortney; Central California IP Group, P.C.

(57) ABSTRACT

A solar energy collector and/or concentrator, a thermal energy storage and retrieval system including the same, and methods of storing and recovering thermal energy are disclosed. The solar energy collector and/or concentrator may include an array of lenses configured to concentrate solar energy, a plurality of conduits through which a heat storage or heat transport fluid flows, and one or more heat transfer elements on each of the conduits, configured to receive the concentrated solar energy from the lenses and transfer the concentrated solar energy to the heat storage/transport fluid. The conduits are configured to move in at least first and second angular dimensions. The thermal energy storage and retrieval system may include the solar energy collector and/or concentrator, a thermodynamic cycle, and a heat storage and retrieval subsystem. Heat is transferred from the heat storage/transport fluid to the heat storage and retrieval subsystem and/or the thermodynamic cycle.

20 Claims, 14 Drawing Sheets

(56) References Cited

U.S. PATENT DOCUMENTS

2011/0100611 A1* 5/2011 Ohler .................. F01K 3/00
                                                              165/104.28

* cited by examiner

SOLAR ENERGY COLLECTOR AND/OR CONCENTRATOR, AND THERMAL ENERGY STORAGE AND RETRIEVAL SYSTEM INCLUDING THE SAME

RELATED APPLICATION(S)

The present application claims priority to U.S. Provisional Pat. Appl. No. 62/209,898, filed Feb. 3, 2016, incorporated herein by reference in its entirety. The present application may also be related to U.S. patent application Ser. No. 15/369,200, filed Dec. 5, 2016, and U.S. patent application Ser. No. 15/424,036, filed Feb. 3, 2017, the relevant portions of each of which are incorporated herein by reference.

FIELD OF THE INVENTION

The present invention generally relates to the fields of solar energy concentration and collection, thermal energy storage and retrieval systems, and methods of making and using the same. More specifically, embodiments of the present invention pertain to a solar energy collector and a thermal energy storage and retrieval device that includes the solar energy collector. The present solar energy collector and thermal energy storage and retrieval device can provide energy storage for commercial PV power plants, for example.

DISCUSSION OF THE BACKGROUND

U.S. Pat. No. 3,985,118 discloses a solar furnace wherein multiple Fresnel lenses focus light rays upon heat conductors associated with each of the lenses. Each heat conductor has an exposed arcuate portion which serves to mount lens supporting means permitting pivotal movement of the supporting means about the conductor to maintain the lens focus in common with a portion of the conductor. Fluid passing through the vessels is heated to the extent that it may be used for powering a steam turbine associated with an electrical generator. To provide a self-contained, transportable generating system the solar furnace may be incorporated into a structure mounting additional components providing for condensation of the steam and recirculation to the solar furnace vessels.

U.S. Pat. No. 3,991,741 discloses an array of linear lenses, used as a combination roof-skylight-solar collector. The lenses are oriented at a given latitude to face the most remote of the earth's poles inclined by the local latitude angle. Moving absorbers are used to receive the sunlight at the focal spot of each lens. The absorbers move back and forth during the day as the sun's position changes, causing the focal spots to move.

U.S. Pat. No. 4,058,110 discloses a cylindrical reflector or lens, used under aberrated conditions in conjunction with an enlarged primary collector to obtain wide angle scanning performance that will allow concentration of solar radiation without extensive tracking. The cylindrical reflectors or lenses operate under aberrated conditions in conjunction with an enlarged primary collector to produce scanning properties that allow for the tracking of the sun for extended periods of time with no mechanical motion.

One type of solar air heater includes a housing having a transparent front wall, an inlet and outlet for establishing a flow path for air to be heated, and a porous radiation absorbent collector plate positioned across the flow path and arranged to accept incident solar radiation passing through the front wall. A radiation trap is placed inside the housing either adjacent to the front wall, directly on top of the collector plate, or between the collector plate and the front wall. The radiation trap has a cellular or "honeycomb" structure and is made from a material which is light-transmitting but opaque to infrared radiation.

Another solar radiation collector employs a dual flow path relative to heat transfer surfaces of the collector panel. A major air flow is confined beneath the panel, but a subsidiary (bypass) air flow at an angle to the principal air flow is employed to suppress natural (free) flow convection at an upper side of the panel. The subsidiary air flow can be established by perforations in the collector panel and by creation of a suction for the bypass air. Energy collection is further enhanced by the use of a collector panel having a low thermal mass and providing good thermal interchange with a relatively small air mass moving beneath and above the panel, while being arranged to limit thermal conduction along the panel in the direction of air flow. Thus, a thermal gradient is established along the length of the collector panel, with a low temperature differential with the heated air mass at every position, with a fast heating response time and minimized reradiation losses. Examples of such gradient "solar traps" that facilitate incoming radiation and prevent long wave infra-red reradiation are provided in Union Carbide's U.S. Pat. No. 4,262,657 and Knöös U.S. Pat. No. 4,054,124.

This "Discussion of the Background" section is provided for background information only. The statements in this "Discussion of the Background" are not an admission that the subject matter disclosed in this "Discussion of the Background" section constitutes prior art to the present disclosure, and no part of this "Discussion of the Background" section may be used as an admission that any part of this application, including this "Discussion of the Background" section, constitutes prior art to the present disclosure.

SUMMARY OF THE INVENTION

The present invention relates to a solar energy collector and/or concentrator, comprising an array of lenses configured to concentrate solar energy, a plurality of conduits through which a heat storage or heat transport fluid flows, and one or more heat transfer elements on each of the plurality of conduits, configured to receive the concentrated solar energy from at least some of the array of lenses and transfer the concentrated solar energy directly or indirectly to the heat storage or heat transport fluid. The conduits hang under the array of lenses and are configured to move in each of at least two angular dimensions. In some embodiments, the lenses comprise Fresnel lenses. For example, the array of lenses comprises a square-packed, rectangularly-packed or hexagonally-packed array of Fresnel lenses.

In various embodiments of the present solar energy collector and/or concentrator, each of the heat transfer elements may comprise a material configured to convert UV, visible and/or IR light to thermal energy. The present solar energy collector and/or concentrator may further comprise a thermally conductive material between each of the heat transfer elements and a corresponding one of the plurality of conduits.

In one aspect, the present solar energy collector and/or concentrator may further comprise a plurality of posts supporting the array of lenses, a plurality of beams or rails supporting the plurality of conduits, and/or a plurality of wires or cables suspended directly or indirectly from the posts and/or the lenses, supporting (directly or indirectly)

the plurality of conduits. For example, the beams or rails may be supported by (e.g., connected to) the wires or cables. The heat transfer elements may have a width less than a diameter or width of the corresponding conduit, and/or may be spaced apart by a distance greater than a length of each heat transfer element. The solar energy collector and/or concentrator may further comprise one or more mechanisms configured to move the plurality of conduits and/or the plurality of beams or rails in at least one of the first and second angular dimensions (or alternatively, in at least two of three perpendicular and/or orthogonal directions). In such cases, when the sun has a position exposing the array of lenses to the solar energy, the solar energy collector and/or concentrator may be configured to move or place the plurality of conduits in a position or location corresponding to the position of the sun so that the heat transfer elements receive the concentrated solar energy from the array of lenses (e.g., using one or more motors such as servo motors to position the array of lenses and/or the beams or rails so that the heat transfer elements continuously receive the focused and/or concentrated solar energy from the array of lenses, in a so-called "follow-the-sun"-type of solar collector). In one example, the solar energy collector and/or concentrator comprises at least one first motor configured to move the conduits and/or the beams or rails in the first angular dimension and at least one second motor configured to move the conduits and/or the beams or rails in the second angular dimension.

In various embodiments, the present solar energy collector and/or concentrator may further comprise (i) a distributing pipe or tube feeding the heat storage or heat transport fluid to each of the plurality of conduits and/or (ii) a collection pipe or tube receiving the heat storage or heat transport fluid from each of the plurality of conduits.

In another aspect, the present solar energy collector and/or concentrator may comprise a plurality of conduits, a heat conducting sheet having a heat absorbing surface, a light concentrating tube with a radiation reflecting surface on a lower part thereof, and a housing or body having thermal isolation therein, the housing or body enclosing the plurality of conduits, the heat conducting sheet, and the light concentrating tube. In some embodiments, the solar energy collector and/or concentrator may further comprise a transparent panel or lid on the housing or body, the heat absorbing surface may be black (or another light-absorbing color, such as charcoal gray, indigo, etc.), the light concentrating tube may comprise a glass vacuum tube, and/or the conduits may be connected in series.

In yet another aspect, the present invention relates to a solar energy collector, comprising a transparent panel or lid, a plurality of parallel reflective panels, and a housing or body having an inlet and an outlet. A heat storage or heat transport fluid enters the solar energy collector through the inlet, is configured to be heated by solar energy as it passes over the panels, and exits the solar energy collector through the outlet. In various embodiments of the solar energy collector, the housing or body may have an interior surface and/or a bottom with a color and/or a topography adapted to absorb solar radiation, and/or the solar energy collector may further comprise a valve configured to control an amount or a rate of working fluid passing through the solar energy collector per unit time.

The present invention also relates to a thermal energy storage and retrieval system, comprising any of the present solar energy collectors and/or concentrators, one or more thermodynamic cycles configured to exchange heat in each of a relatively low-pressure process and a relatively high-pressure process (e.g., with a relatively low-temperature body and/or a relatively high-temperature body), and a heat storage and retrieval subsystem configured to exchange heat with at least a first one of the thermodynamic cycle(s) in at least one of a charging operation and a discharging operation. The solar energy collector(s) and/or concentrator(s) are configured to collect, concentrate and/or transfer solar heat to (i) the heat storage and retrieval subsystem and/or (ii) at least a second one of the thermodynamic cycle(s) during a charging operation. The second thermodynamic cycle(s) are the same as or different from the first thermodynamic cycle(s).

In various embodiments of the thermal energy storage and retrieval system, the solar energy collector and/or concentrator may reject heat to the heat storage and retrieval subsystem during the charging operation. In such embodiments, the heat storage and retrieval subsystem may reject heat to the first thermodynamic cycle(s) during a discharging operation, and the first and second one(s) of the one or more thermodynamic cycles may be different, in which case the second thermodynamic cycle(s) may reject heat to the heat storage and retrieval subsystem during the charging operation. Additionally, the solar energy collector and/or concentrator may reject heat to at least one of the second thermodynamic cycle(s) during a charging operation and/or the thermodynamic cycle(s) may comprise a plurality of second thermodynamic cycles that reject heat to the heat storage and retrieval subsystem over different (but optionally overlapping) temperature ranges during the charging operation. To enable continuous operation of the first thermodynamic cycle during the discharging operation, the heat storage and retrieval subsystem may have separate flow paths for the charging and discharging operations, and the second thermodynamic cycle(s) may not exchange heat with the first (different) thermodynamic cycle.

The present invention also relates to a method of collecting and/or concentrating solar energy, comprising focusing the solar energy with an array of lenses on one or more heat transfer elements on each of a plurality of conduits hanging under the array of lenses, transferring the solar energy directly or indirectly from the heat transfer elements to a heat storage or heat transport fluid in the conduits, passing or flowing the heat storage or heat transport fluid through the conduits, and moving the conduits in at least two angular dimensions to continuously focus the solar energy from the lenses on the heat transfer elements.

The present invention further relate to a method of storing thermal energy, comprising collecting and optionally concentrating solar energy using the present solar energy collector and/or concentrator, rejecting heat from the heat storage or heat transport fluid to at least one of (i) the heat storage and retrieval subsystem and (ii) one or more thermodynamic cycles, and pumping a heat storage medium from a cold storage vessel or reservoir to a hot storage vessel or reservoir through one or more conduits. The conduit(s) may pass through one or more heat exchangers configured to exchange heat with the heat storage or heat transport fluid and/or a working fluid in the thermodynamic cycle(s).

In the method of storing thermal energy, heat may be rejected from the heat storage or heat transport fluid to the heat storage medium over a first temperature range, and the method may further comprise rejecting heat from a working fluid in the one or more thermodynamic cycles through at least one different heat exchanger to the heat storage medium over a second temperature range different from the first temperature range.

The present invention enables collection and/or concentration of solar energy at or in one temperature range, and storage of the collected solar energy at or in one or more different temperature ranges, thereby greatly expanding the ability of thermal energy storage and retrieval systems to store heat (including at least in part solar energy collected using the present solar energy collector and/or concentrator) over a much broader temperature range than conventional solar energy-based thermal energy storage and retrieval systems.

DETAILED DESCRIPTION

Examples of various embodiments of the invention are illustrated in the accompanying drawings. While the invention will be described in conjunction with the following embodiments, it will be understood that the descriptions are not intended to limit the invention to these embodiments. On the contrary, the invention is intended to cover alternatives, modifications and equivalents that may be included within the spirit and scope of the invention. Furthermore, in the following detailed description, numerous specific details are set forth in order to provide a thorough understanding of the present invention. However, it will be readily apparent to one skilled in the art that the present invention may be practiced without these specific details. In other instances, well-known methods, procedures, components, and materials have not been described in detail so as not to unnecessarily obscure aspects of the present invention.

The technical proposal(s) of embodiments of the present invention will be fully and clearly described in conjunction with the drawings in the following embodiments. It will be understood that the descriptions are not intended to limit the invention to these embodiments. Based on the described embodiments of the present invention, other embodiments can be obtained by one skilled in the art without creative contribution and are in the scope of legal protection given to the present invention.

Furthermore, all characteristics, measures or processes disclosed in this document, except characteristics and/or processes that are mutually exclusive, can be combined in any manner and in any combination possible. Any characteristic disclosed in the present specification, claims, Abstract and Figures can be replaced by other equivalent characteristics or characteristics with similar objectives, purposes and/or functions, unless specified otherwise.

The invention, in its various aspects, will be explained in greater detail below with regard to exemplary embodiments.

Exemplary Energy Collection and Heat Storage and Retrieval Devices

Figure 1:
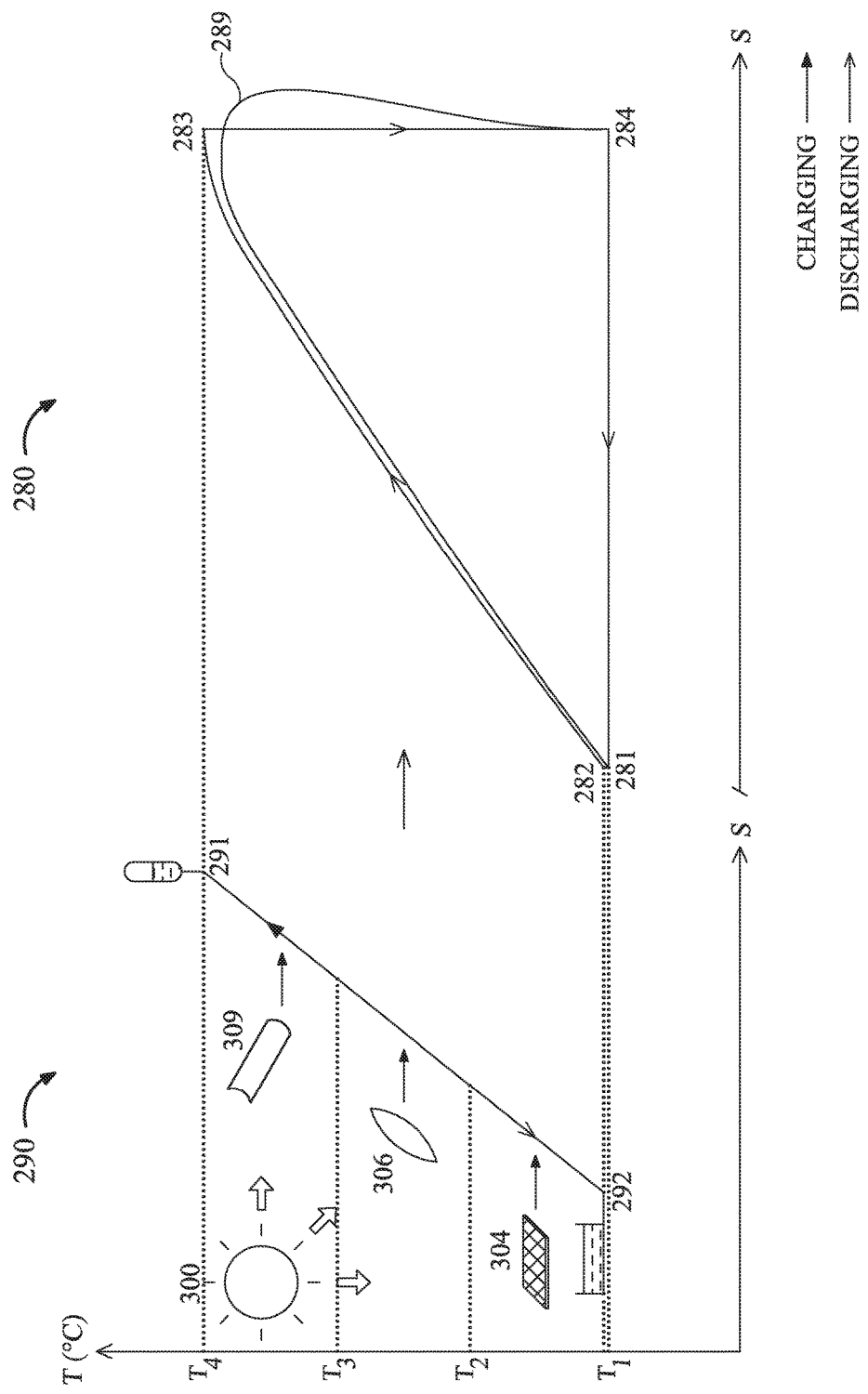
FIGS. 1 and 2 show a TS diagram and a layout of an exemplary trilateral cycle in conjunction with a thermal energy storage and retrieval subsystem that uses solar charging with different collectors for different temperature ranges, according to one or more embodiments of the present invention.
Figure 2:
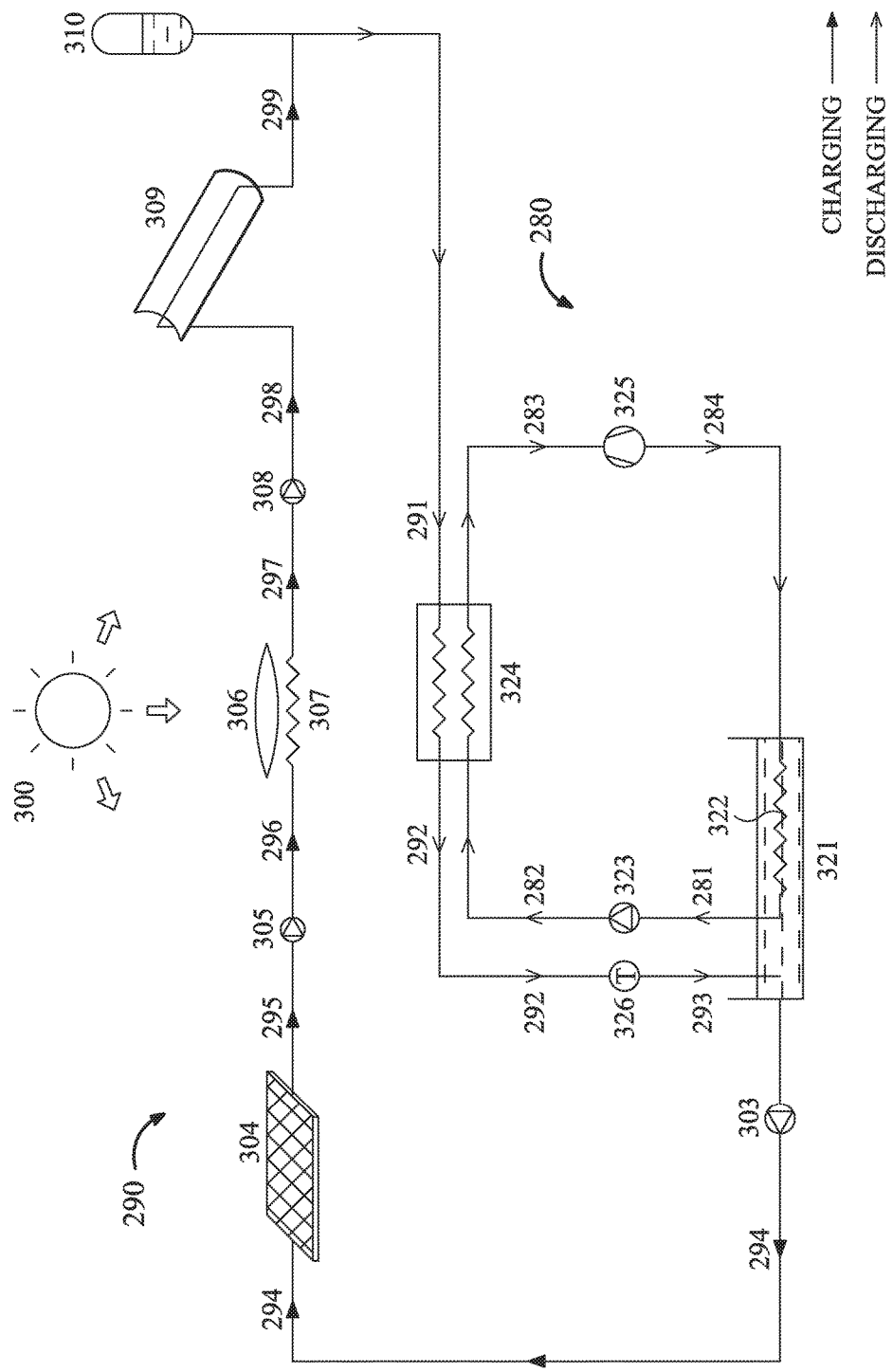

FIGS. 1 and 2 show a TS diagram and a layout of an exemplary trilateral cycle 280 in conjunction with a thermal energy storage and retrieval subsystem 290 that uses solar charging with different collectors for different temperature ranges. The thermal energy storage and retrieval subsystem 290 includes a low temperature collector 304, a medium temperature concentrating collector 306 and a high temperature concentrating and solar tracking collector 309, in addition to the hot storage tank 310 and cool storage reservoir 321. The different collectors 304, 306 and 309 can be in the same housing (see, e.g., FIG. 15).

In charging mode, a pump 303 pumps the heat storage medium (which, in one example, may be water) from the cold storage reservoir 321 to the low temperature collector 304. The relatively cold heat storage medium absorbs heat at 294-295 from the low temperature collector 304, and a second pump 305 pumps the heat storage medium from the low temperature collector 304 to the concentrating collector 306, where the heat storage medium absorbs more heat at 296-297. A third pump 308 pumps the heat storage medium from the concentrating collector 306 to the concentrating and solar tracking collector 309, where the heat storage medium absorbs even more heat at 298-299 before being collected and/or stored in the hot storage tank 310. A single pump is sufficient if the low and medium temperature collectors are designed for the pressure in 310.

The trilateral cycle 280 in FIGS. 1-2 is a heat engine. Starting at 281 in the trilateral cycle 280, a pump 323 pumps the working fluid from 281 to 282. The relatively hot storage fluid in the heat storage and retrieval subsystem 290 exchanges heat with the working fluid in the heat exchanger 324, then passes through an expander 326 (e.g., an impulse turbine) and is collected in the cool storage reservoir 321. The turbine 326 may recover and transfer some mechanical and/or electrical energy to the pump 323. At 283-284, an expander 325 expands the hot, high-pressure working fluid (i.e., gas) in the trilateral cycle 280. Mechanical energy may be retrieved or recovered during the expansion process. At 284-281, a heat exchanger 322 transfers heat from the low-pressure working fluid in the trilateral cycle 280 to the cold heat storage medium in the cool reservoir 321 while condensing the working fluid.

The implementation in FIGS. 1-2 has many advantages. No compressors are needed, as the trilateral cycle 280 operates only in discharging mode. Under typical conditions, most of the charging can be conducted or performed in a few hours or less (e.g., around noon, during a period of relatively high solar intensity), but the energy retrieval and discharging cycle can run continuously (e.g., for up to 24 hours/day). An impulse turbine can do the expansion (e.g., in expander 325). This is a very inexpensive solution that can provide higher total efficiency than a conventional steam cycle. Additional advantages with an impulse turbine include (a) the ability to handle a relatively big pressure difference in one step and (b) the ability to keep the peripheral speed (which depends on the pressure) constant and to easily regulate the power with variable nozzles. In a positive displacement device, the power depends on rpm, and may need expensive inverters.

Figure 3:
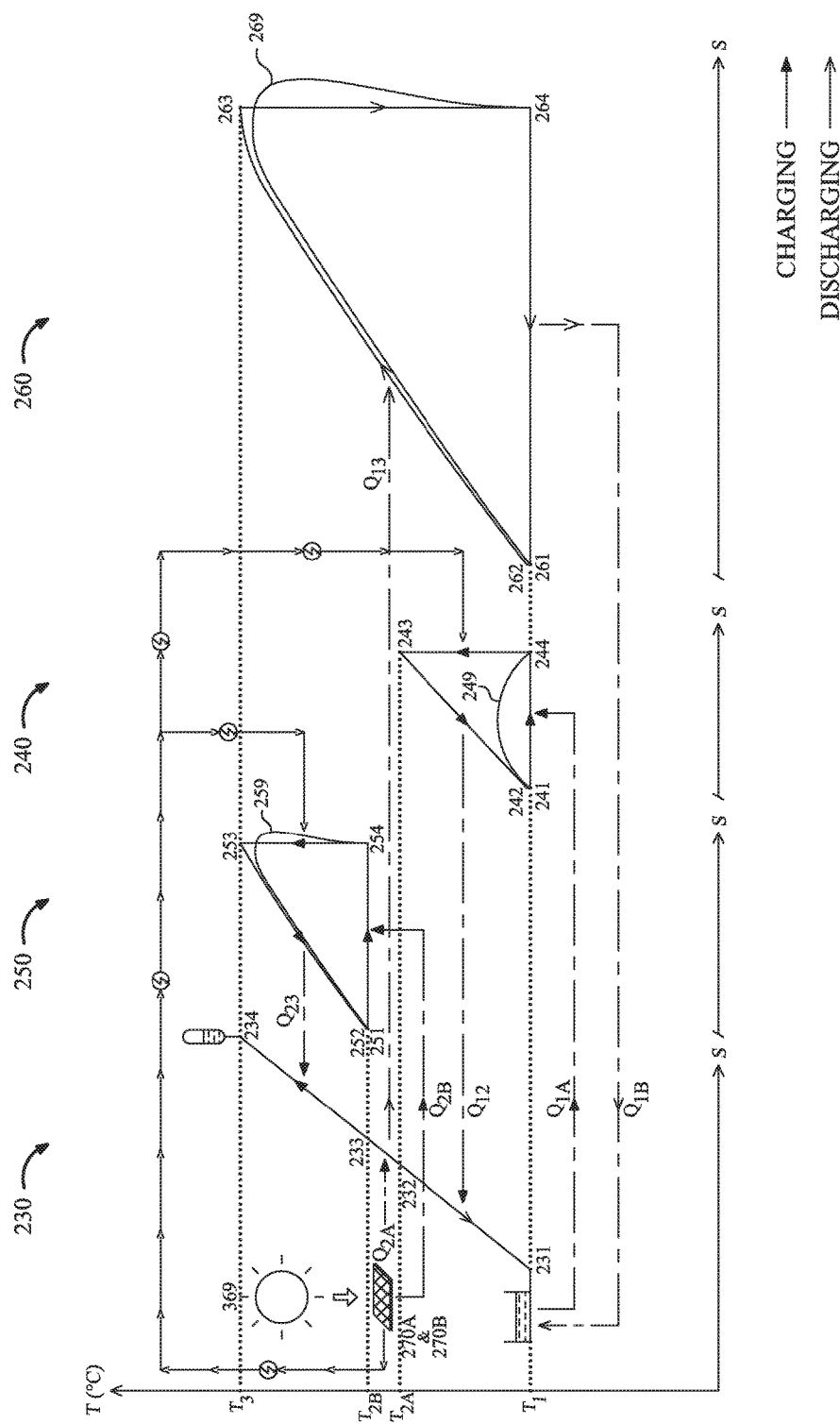
FIGS. 3 and 4 show a TS diagram and a layout of an exemplary thermal energy storage and retrieval system that charges (e.g., stores thermal energy) using two trilateral cycles and a photovoltaic thermic (PVT) cell, according to one or more embodiments of the present invention.
Figure 4:
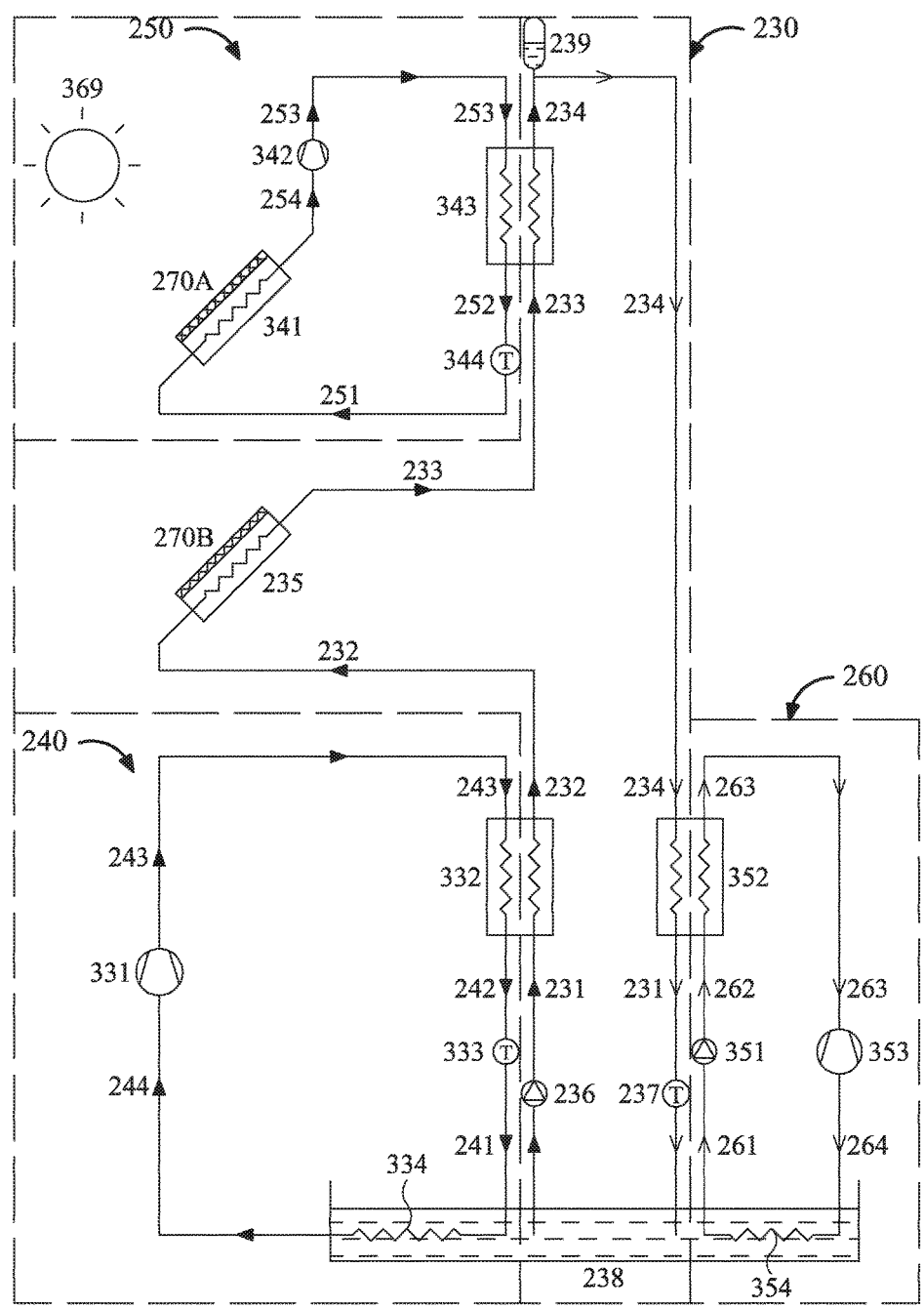

FIGS. 3 and 4 show a TS diagram and a layout of an exemplary thermal energy storage and retrieval system that charges (e.g., stores thermal energy) using two trilateral cycles 240 and 250 and a photovoltaic thermic (PVT) cell 270. The PVT cell 270 produces electricity and collects heat. The electricity drives the compressors 331 and 342 in the trilateral cycles 240 and 250, respectively, in the charging mode. The heat $Q_{2A}$ from the PVT cell 270A is the heat rejected to the heat storage liquid (e.g., at 232-233), and the heat $Q_{2B}$ from the PVT cell 270B is the heat source for the evaporator (e.g., at 251-254) in the high-temperature trilateral cycle 250. In a typical implementation, the trilateral cycles 240 and 250 operate only in the charging mode.

The thermal energy storage and retrieval system of FIGS. 3 and 4 further includes a third trilateral cycle 260 that operates in the discharging mode, and similar to the trilateral cycle 280 in FIGS. 1-2. Like the system of FIGS. 1-2, the system of FIGS. 3-4 can fully or substantially fully charge in a few hours during daylight, but the discharging cycle can run continuously (e.g., for up to 24 hours/day). The compressors 331 and 342 are driven by electricity generated from solar energy, and the pumps (e.g., pumps 236 and 351) can be driven by mechanical and/or electrical energy from turbines 237, 333 and 344 (and, if necessary or desired, from expander 353), making the system of FIGS. 3-4 completely self-contained.

An Exemplary Solar Concentrator

Figure 5:
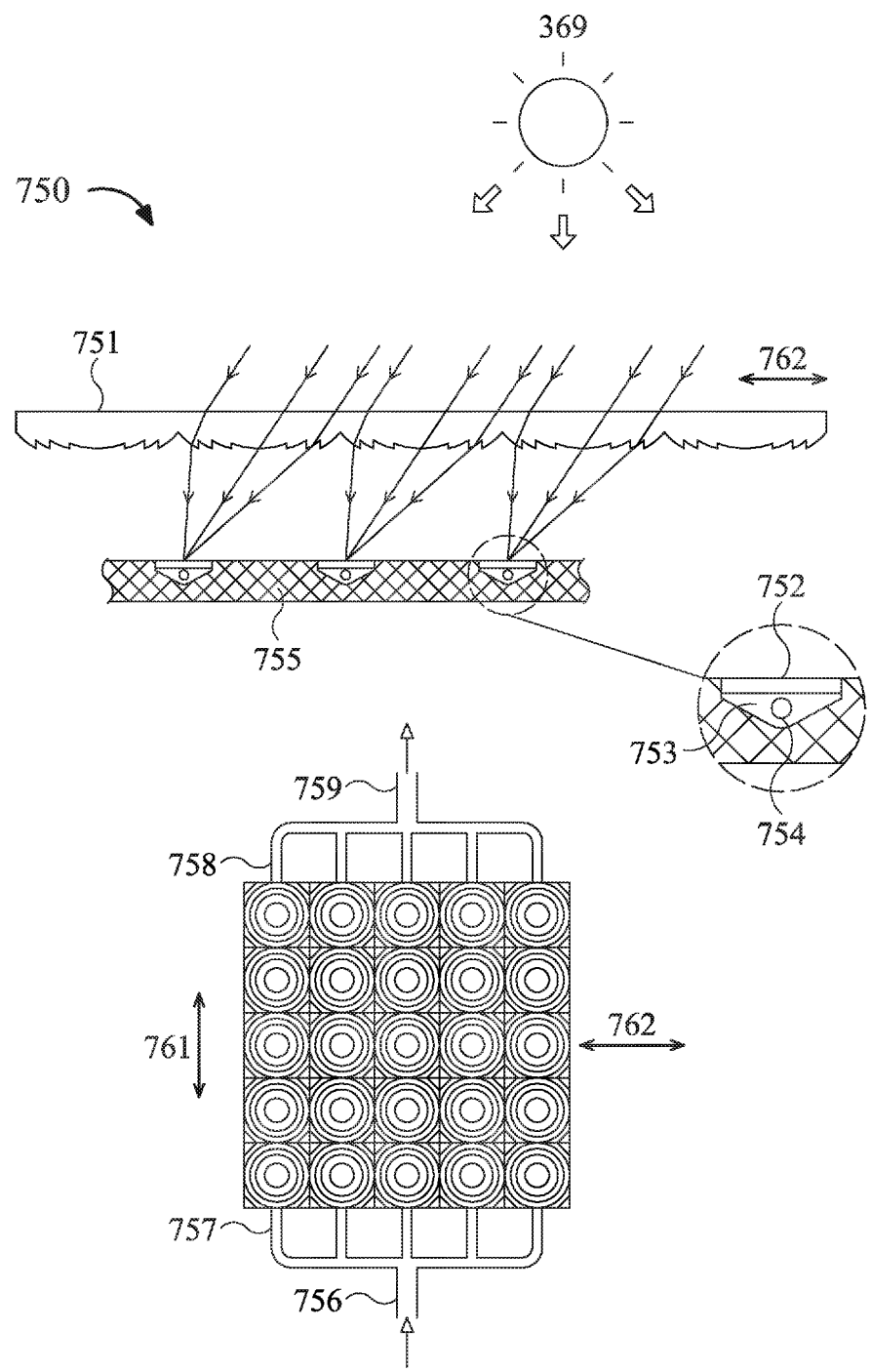
FIG. 5 shows an exemplary Fresnel array concentrating collector in accordance with one or more embodiments of the present invention.

FIG. 5 shows an exemplary Fresnel array concentrating collector 750. The Fresnel concentrating collector 750 includes a Fresnel lens array 751 (which can also function as the cap or lid to the concentrating collector 750), an array of concentrating photovoltaic thermal (CPVT) heat collectors 752 attached to heat conducting heat transfer elements 753 transferring heat from the collectors 752 to the conduits 754. The CPVT collectors 752, the heat transfer elements 753 and the conduits 754 are thermally isolated from each other by a support frame 755 for the conduits 754, the heat collectors 752, and the heat transfer elements 753. In the conduits 754 flows either a heat storage fluid or a heat transfer fluid absorbing the heat from the heat collectors 752. In order to keep the lens focused on the collector, the lens array 751 may move relative to the collectors 752 (or the collectors 752 may move relative to the lens array 751) in one or two perpendicular directions 762 and 761. The relative movement may be accomplished either by moving the collector array (e.g., the frame 755, which in turn moves the CPVT collectors 752, the heat transfer elements 753 and the conduits 754), or both (i.e., perpendicular movement along an axis perpendicular and/or orthogonal to both directions 761 and 762). This collector 750 is useful for the cycle(s) in FIGS. 1-2, 3-4, 17-18 and 19-20.

Figure 6:
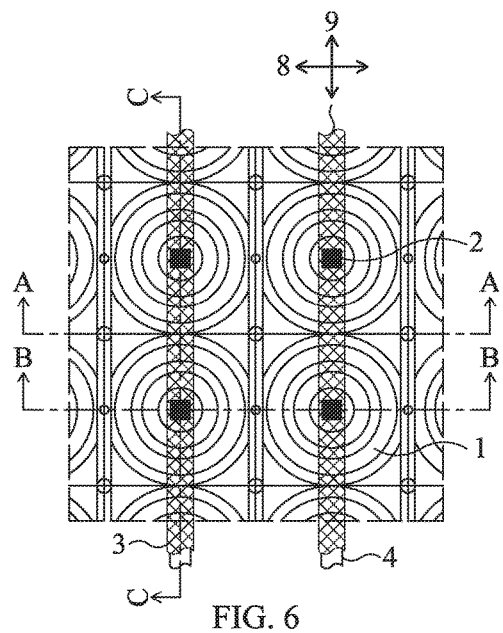
FIG. 6 is a top-down view of an exemplary Fresnel array concentrating collector in greater detail, in accordance with one or more embodiments of the present invention.

FIG. 6 shows a section of an exemplary Fresnel array concentrating collector in a "hanging" heat collector. The section includes four Fresnel lenses 1 from the array of lenses. The Fresnel lenses 1 concentrate solar energy (in the form of light and/or heat) onto heat collector and/or transfer elements 2 on conduits 4. The heat collector and/or transfer elements 2 may comprise one or more materials that have relatively high thermal conductivity and/or that relatively efficiently convert solar radiation (e.g., visible, UV and/or IR light) to thermal energy. The conduits 4, which may be surrounded by or encased in insulation 3 in locations other than the heat collector and/or transfer elements 2, transport a heat storage or heat transfer fluid from the inlet or entrance of the concentrating collector to the outlet or exit of the concentrating collector as it absorbs heat from the heat collector and/or transfer elements 2.

Figure 7:
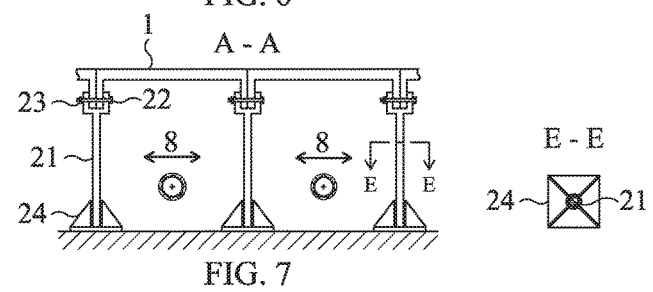
FIGS. 7, 8 and 9 are cross-sectional views of the exemplary Fresnel array of FIG. 6 along the lines A-A, B-B and C-C, respectively.

FIG. 7 is a cross-sectional view of the exemplary Fresnel array of FIG. 6 along the line A-A and/or the direction or axis 8, between adjacent rows or columns of Fresnel lenses 1. The array of Fresnel lenses 1 is supported by posts 21, which are in turn mechanically supported by post stands 24 (see the top-down view of an exemplary post 21 and post stand 24 from the plane E-E). Individual Fresnel lenses 1 may have perpendicular and/or orthogonal support posts that fit into a receptacle or holder 23 along with identical or substantially identical support posts from three adjacent lenses 1, secured together with a binding or strap 22. The conduits 4 are aligned along the direction or axis 9 (FIG. 6).

Figure 8:
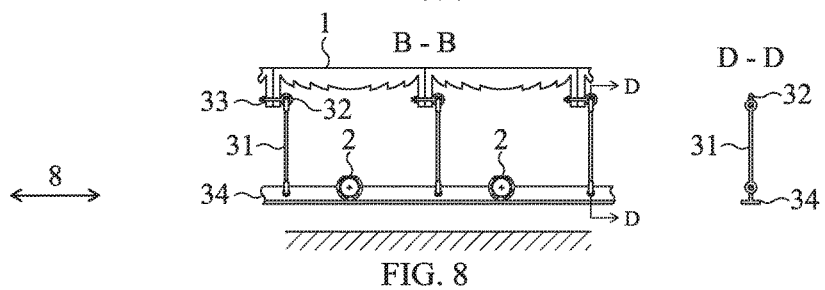

FIG. 8 is a cross-sectional view of the exemplary Fresnel array of FIG. 6 along the line B-B and/or the direction or axis 8, along a center of a row or column of Fresnel lenses 1 and through the heat collector and/or transfer elements 2. The conduits 4 (FIG. 6) are supported by support rails or beams 34 that hang from wires or cables 31 attached to rings 32 secured to the lenses 1 by brackets or straps 33. In such an arrangement, the Fresnel lenses 1 allow the heat-absorbing structures to hang so that they can move in three dimensions. By enabling movement in the X and Y directions (depicted by 8 and 9 in FIGS. 6, 8 and 9), the Fresnel lenses 1 can focus light and/or heat from the sun onto the heat collector and/or transfer elements 2 over a variety of angles of the sun relative to the array of Fresnel lenses 1.

A mechanism such as a servo motor, hydraulic or pneumatic piston, moves the conduits 4 and/or the support rails or beams 34 in the X and Y directions, represented by the double-headed arrows 8 and 9, respectively, in FIGS. 6-9. For example, one motor or piston (or group of distributed motors and/or pistons') can move the support rails or beams 34 along the direction represented by the double-headed arrow 8 (FIG. 8), and another motor or piston (or group of distributed motors and or pistons) can move the conduits 4 along the direction represented by the double-headed arrow 9 (FIG. 9), although the invention is not limited to such an arrangement. When the wires or cables 31 have a fixed length, such movement causes the conduits 4 to also move up or down (e.g., along the Z direction), and the focus points of the lenses L the length of the wires or cables 31, and the movements of the conduits 4 and/or the support rails or beams 34 may be determined so that the focus points of the lenses 1 is on the heat collector and/or transfer elements 2 as the angle of the incoming radiation changes over the day. Such movement may describe or be defined by a spherical surface. Thus, movement of the heat collector and/or transfer elements 2, the conduits 4, and/or the support rails or beams 34 can be defined with respect to angular dimensions (e.g., the polar and azimuth angles) in a spherical coordinate system, along a fixed radius.

Movement in the Z direction may depend on the length on the wires or cables 31. For example, the wires or cables 31 can have a fixed length equal to or about equal to the focal length of the lenses 1. Attaching the fixed-length wires or cables 31 to the lenses 1 (or a support structure for the lenses 1) and moving the conduits 4 and/or the support rails or beams 34 in the directions of the arrows 8 and/or 9 (e.g., the X and Y directions) effectively raises and/or lowers the conduits 4 and/or the support rails or beams 34 (e.g., the Z direction). The result or outcome is a "follow-the-sun" focused Fresnel solar heat absorber that can be mounted in one or more arrays.

The length of the wires or cables 31 (a cross-sectional view along the line D-D of which is provided in FIG. 8) is generally at or adjusted to the focus length of the Fresnel lenses 1. The heat absorbing spot (e.g., on the heat collector and/or transfer elements 2) and the focus point of the Fresnel lenses 1 can then be relatively small, resulting in an increased temperature at the focus point of the Fresnel lenses 1 (e.g., on the heat collector and/or transfer elements 2) over a longer period of time during the day. Smaller heat absorbing spots diminish and may minimize undesired heat dissipation.

Figure 9:
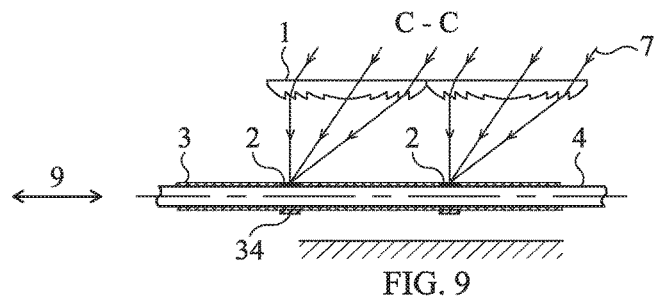

FIG. 9 is a cross-sectional view of the exemplary Fresnel array of FIG. 6 along the line C-C and/or the direction or axis 9. It shows the ability of the Fresnel lenses 1 to focus the radiation and/or heat 7 from the sun onto the heat collector and/or transfer elements 2 on the conduit 4, regardless of the angle of the sun.

Figure 10:
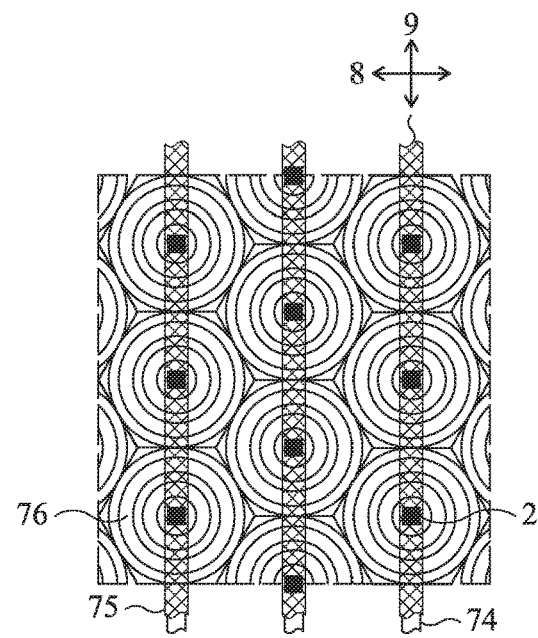
FIGS. 10 and 11 are top-down views of yet another exemplary Fresnel array concentrating collector in accordance with one or more embodiments of the present invention.

FIG. 10 shows an alternative arrangement of Fresnel lenses 76 that are hexagonally-packed in the array of lenses in the concentrating collector. Similar to the arrangement shown in FIGS. 6-9, the Fresnel lenses 76 concentrate solar energy (in the form of light and/or heat) onto heat collector and/or transfer elements 2 on conduits 74, which transport a heat storage or heat transfer fluid from the inlet or entrance of the concentrating collector to the outlet or exit of the concentrating collector as it absorbs heat from the heat collector and/or transfer elements 2.

Figure 11:
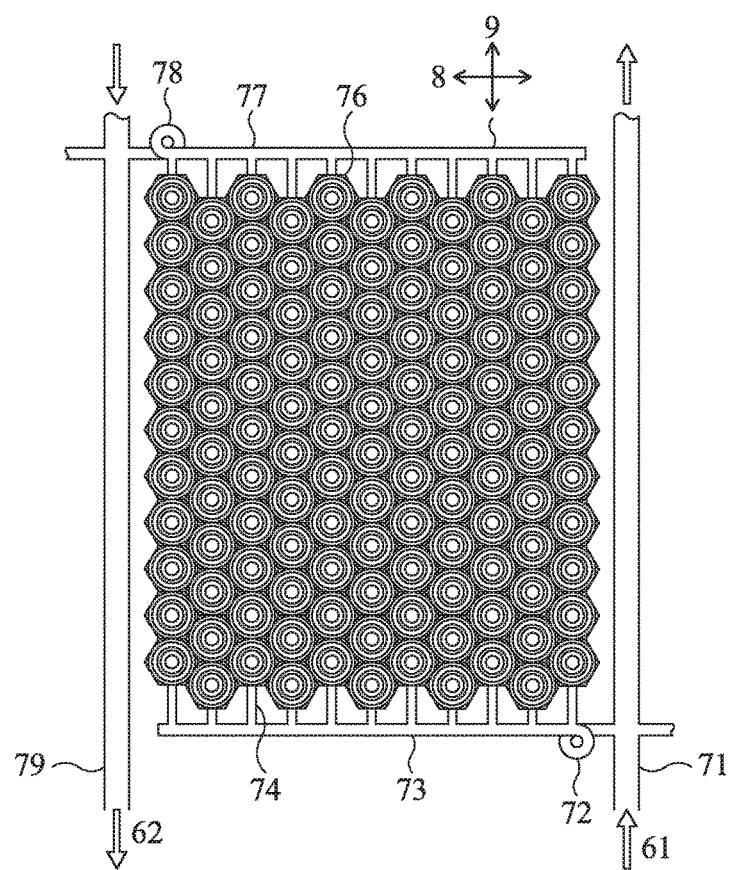

FIG. 11 shows a top-down view of an exemplary concentrating collector including a hexagonally-packed array of Fresnel lenses 76. A relatively cool heat storage or heat transfer fluid 61 is fed or transported to the concentrating collector (e.g., by a pump) along a first main conduit 71, and then enters the concentrating collector through a flexible connection (e.g., a flexible loop or coil) 72 into a feed pipe or tube 73. The feed pipe or tube 73 acts as a manifold for each of the conduits 74 below the array of lenses 76. The heat storage or heat transfer fluid is heated as it passes under the array of lenses 76 and is collected in a collection pipe or tube 77, which also acts as a manifold (or an inverted manifold) for the conduits 74. The heated heat storage or heat transfer fluid then passes through another flexible connection (e.g., loop or coil) 78 into a second main conduit 79, where it flows to a next stage of a thermodynamic cycle or a heat storage vessel in a heat storage subsystem.

The flexible connections 72 and 78 allow for movement of the feed pipe or tube 73, the conduits 74, and the collection pipe or tube 77 under the array of lenses 76, and thus act as flexible conduits between the pipes or tubes 73/77 and the main conduits 71 and 79. A number of such arrays can be connected in parallel, and one main conduit 71 or 79 serves as a high-pressure side to the parallel arrays, providing incoming liquid for the concentrating collectors, and the other main conduit 71 or 79 serves as a low-pressure side, transporting the outgoing (hot) liquid. Such as arrangement is similar to a conventional heating system in a house (e.g., with two pipes, one pipe in and one pipe out). A pump on the high-pressure side pumps the liquid through the concentrating collectors to the low-pressure side.

Figure 12:
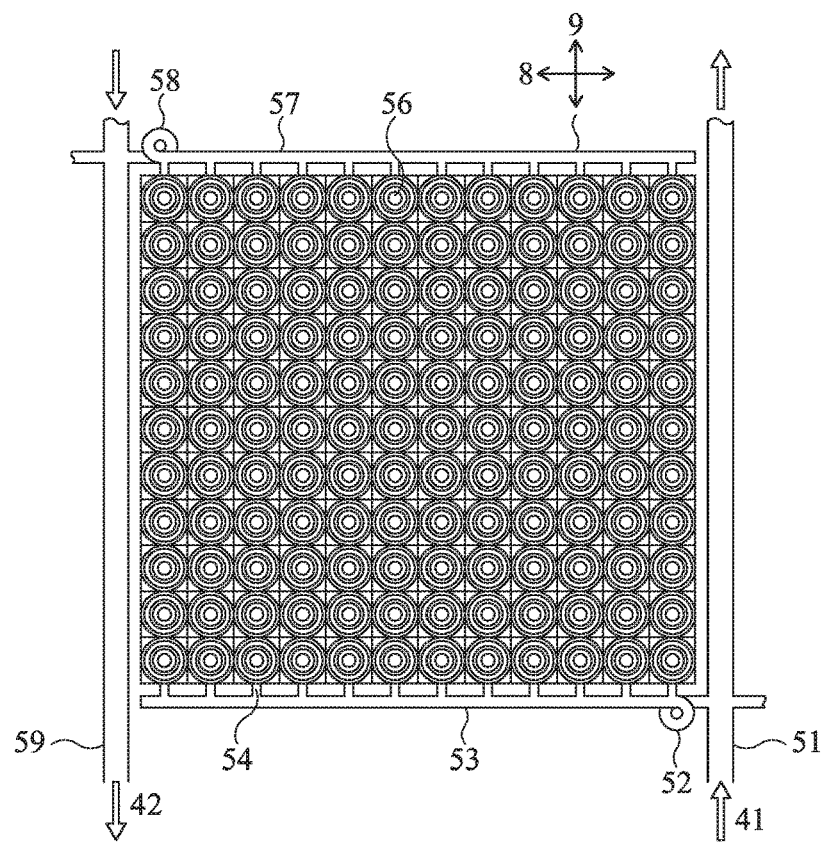
FIG. 12 is a top-down view of a further exemplary Fresnel array concentrating collector in accordance with one or more embodiments of the present invention.

FIG. 12 shows a top-down view of an exemplary concentrating collector including an array of Fresnel lenses 56 in rows and columns (e.g., a "square-packed" array). Similar to the exemplary concentrating collector of FIG. 11, the relatively cool heat storage or heat transfer fluid 41 is fed or transported to the concentrating collector (e.g., by a pump) along a first main conduit 51, and then enters the concentrating collector through a flexible connection 52 into a feed pipe or tube 53, which acts as a manifold for the conduits 54 below the array of lenses 56. The heat storage or heat transfer fluid is heated as it passes under the array of lenses 56 and is collected in a collection pipe or tube 57. The heated heat storage or heat transfer fluid then passes through another flexible connection 58 into a second main conduit 59, where it flows to a next stage of a thermodynamic cycle or a heat storage vessel in a heat storage subsystem. Depending on the relative pressure in the main conduits 51 and 59, the flow can be reversed, as described herein.

Figure 13:
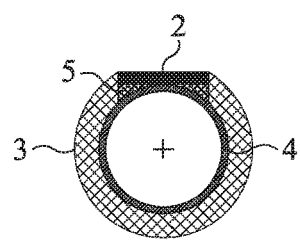
FIGS. 13 and 14 are cross-sectional views of conduits at the location of a heat collector and/or heat transfer element (FIG. 13) or in which an exposed surface of the conduit functions as a heat collector (FIG. 14).

FIG. 13 shows a cross-section of the conduit 4 at the location of a heat collector and/or transfer element 2. As shown in FIG. 13, the conduit 4 is surrounded by insulation 3 except at the location of the heat collector and/or transfer element 2. When the surface of the heat collector and/or transfer element 2 facing the conduit 4 is not complementary to (or does not otherwise match) the surface of the conduit 4 facing the heat collector and/or transfer element 2, any space between the heat collector and/or transfer element 2 and the conduit 4 may be filled or occupied with a thermal conductor 5. Thus, although the heat collector and/or transfer element 2 is shown having a rectangular cross-section and a planar outermost surface, the invention is not limited to such a configuration.

Figure 14:
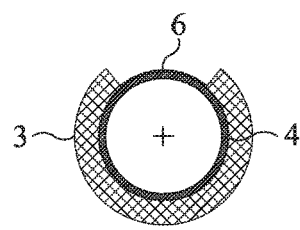

FIG. 14 shows a cross-section of a conduit 4 in which an exposed surface 6 of the conduit 4 (i.e., where there is no insulation 3) functions as a heat collector and transfer element. In such a case, the conduit 4 may comprise an optically absorptive and/or thermally conductive material (e.g., iron, silicon carbide, or a refractory metal or alloy) or a thermally conductive material (e.g., a metal, metal alloy or thermally conductive ceramic such as high-purity silicon carbide or aluminum nitride) with an optically absorptive coating (e.g., one that absorbs ultraviolet, visible and/or infrared light) on the exterior surface.

Additional or Alternative Solar Concentrator Features

A combined direct and concentrating collector may include a transparent panel or lid over the conduits, and/or a heat conducting sheet with a black heat absorbing surface below and/or horizontally adjacent to the conduits. The conduits may comprise a glass tube with a radiation reflecting surface on the lower half, and the collector may further include a housing or body with isolation (e.g., thermal isolation and/or a light reflection barrier) therein. Spacers may allow gas spaces in the collector to be placed under vacuum. The black heat absorbing surface is relatively efficient at low temperature, and the radiation reflecting surface is relatively efficient at high temperature. A heat storage fluid may be heated in the conduits.

Figure 15:
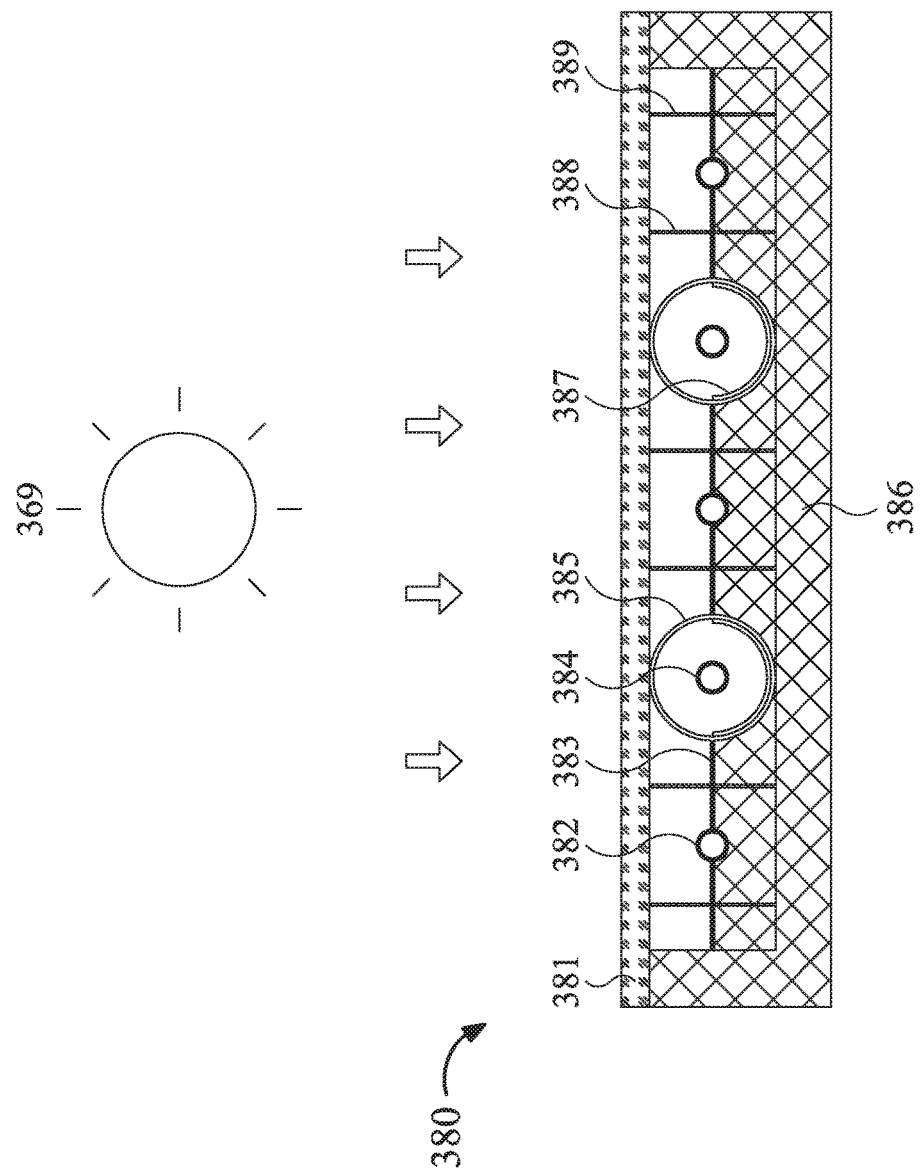
FIG. 15 is a cross-sectional view of an exemplary combined direct and concentrating collector in accordance with one or more embodiments of the present invention.

For example, FIG. 15 shows a cross-section of an exemplary combined direct and concentrating collector 380, which can be used for example as the low temperature collector 304 and the concentrating collector 306 in the system of FIGS. 1-2. The combined direct and concentrating collector 380 includes a transparent panel or lid 381, a first conduit 382, a heat conducting sheet with a black heat absorbing surface 383, a second conduit 384, a glass vacuum tube 385 with a radiation reflecting surface 387 on the lower half, and a housing or body 386 with isolation (e.g., thermal isolation and/or a light reflection barrier). Spacers 388 and 389 allow the gas spaces in the collector 380 to be placed under vacuum. The conduits 385 and 384 are connected in series (e.g., by a U-shaped tube; not shown). The black surface 383 is relatively efficient at low temperature, and the light concentrating part 385, 387 is relatively efficient at high temperature. In a gradient cycle, the storage fluid is first heated in the conduit 382, and then in the conduit 384. Optionally, thereafter, the storage fluid may be further heated in a tracking collector (e.g., tracking collector 309 in FIG. 1).

A gradient solar collector for a heat storage and retrieval subsystem can be used as a low temperature collector (e.g., collector 304 in FIG. 1), a concentrating collector (e.g., collector 306 in FIG. 1), or if placed on a stand configured to track the movement of the sun 369 across the sky, a concentrating and solar tracking collector (e.g., collector 309 in FIG. 1). The gradient solar collector may include a transparent panel or lid, a plurality of reflective panels, and a housing or body. The heat storage fluid enters the solar collector through an inlet, and is heated by solar energy from the sun as it passes over the panels and the bottom of the housing or body. In one embodiment, the interior surface of the bottom of the housing or body can have a color and/or topography (e.g., roughness) adapted to absorb solar radiation. The heated heat storage fluid then exits the solar collector through an outlet. A valve can open and close to control the amount of working fluid passing through the solar collector per unit time.

Figure 16:
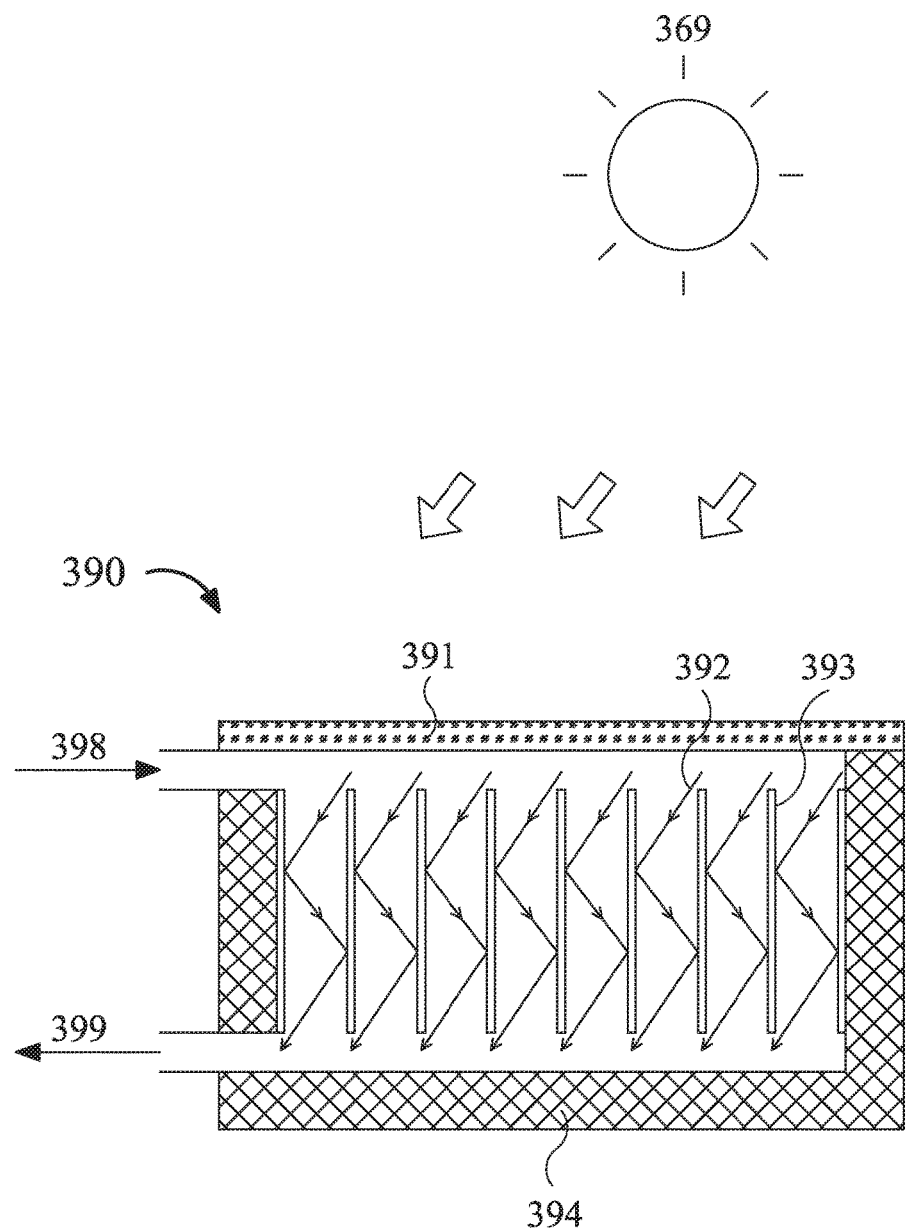
FIG. 16 is a cross-sectional view of an exemplary solar collector for a heat storage and retrieval subsystem.

FIG. 16 is an example of a gradient solar collector 390 for a heat storage and retrieval subsystem that heats a gas passing through it by convection. The solar collector 390 can be used for the low temperature collector 304, the concentrating collector 306, or if placed on a stand configured to track the movement of the sun 369 across the sky, the concentrating and solar tracking collector 309. The solar collector 390 includes a transparent panel or lid 391, a plurality of reflective panels 393, and a housing or body 394. The heat storage fluid enters the solar collector 390 through an inlet 398, is heated by solar energy 392 from the sun 369 as it passes over the panels 393 and the bottom of the housing or body 394. In one embodiment, the interior surface of the bottom of the housing or body 394 can have a color and/or topography (e.g., roughness) adapted to absorb solar radiation. The heated heat storage fluid then exits the solar collector 390 through the outlet 399. A valve (not shown) can open and close to control the amount of working fluid passing through the solar collector 390 per unit time. The main purpose of a so-called "solar trap" (as shown in FIG. 16) is to facilitate absorption of incoming radiation and prevent re-radiation of long wave infrared light.

Exemplary Energy Collection and Heat Storage and Retrieval Devices

Figure 17:
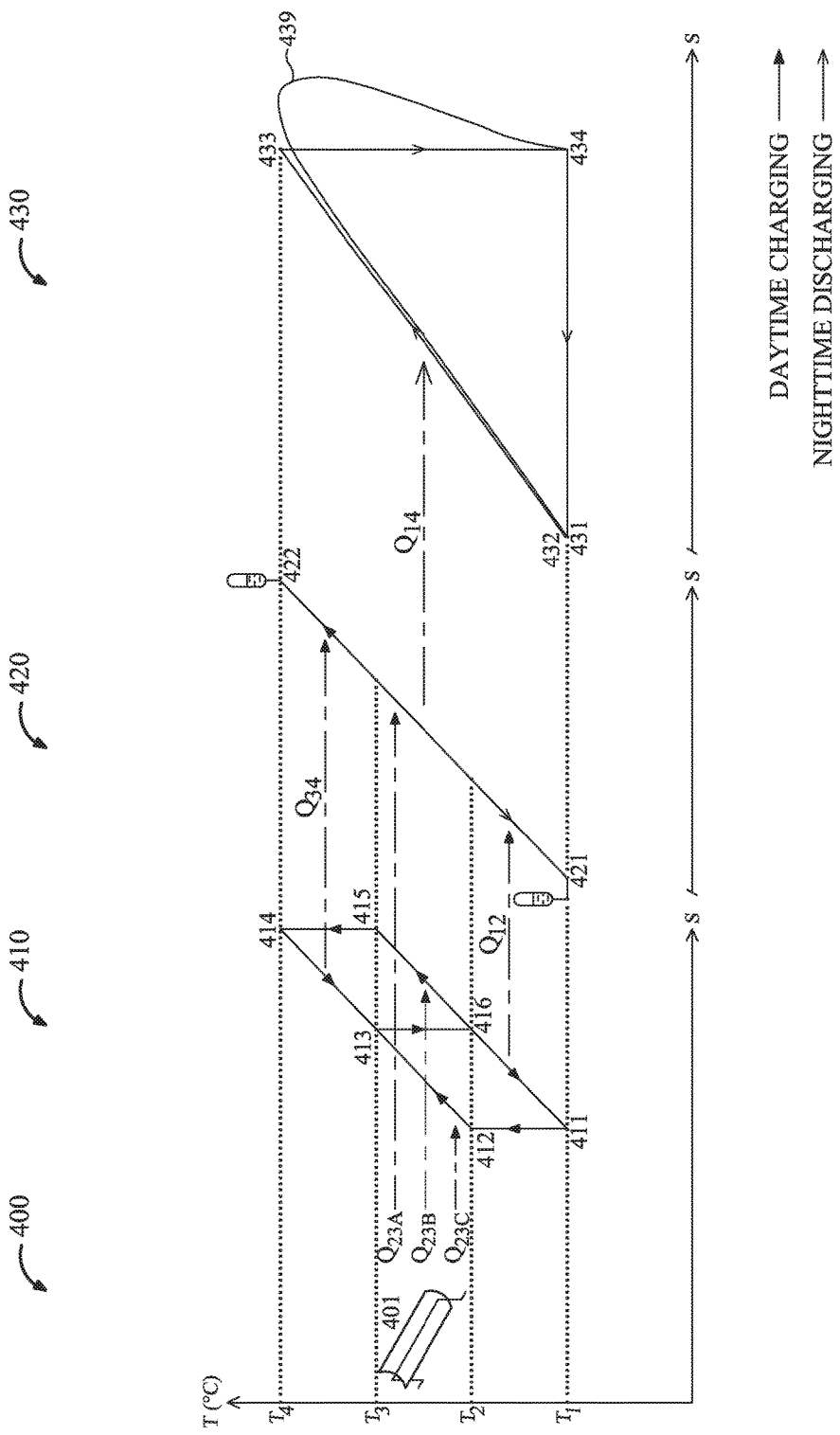
FIG. 17 shows an exemplary thermal energy storage and retrieval system including a combined Brayton cycle, a heat storage device or subsystem, and a trilateral cycle in which solar heat is absorbed by a solar collector over a relatively narrow temperature range in accordance with one or more embodiments of the present invention.

FIG. 17 shows another embodiment including a combined Brayton heat engine and heat pump 410, a heat storage device or subsystem 420, and a trilateral cycle 430, in which solar heat Q23 (i.e., $Q_{23A}$, $Q_{23B}$ and $Q_{23C}$) is absorbed by the solar collector 401 over a relatively narrow temperature range T2-T3. The solar collector 401 may comprise any solar collector and/or concentrator described herein. The Brayton heat engine cycle is 411-412-413-416-411, and the heat pump cycle is 416-415-414-413-416. The heat Q23 is divided into 3 fractions or portions $Q_{23A}$, $Q_{23B}$ and $Q_{23C}$. The heat $Q_{23C}$ is absorbed by the high pressure process 412-413 in the Brayton heat engine cycle, which heat is rejected as $Q_{12}$ by the low pressure process 416-411 and transferred as $Q_{12}$ to the heat storage liquid in the temperature range $T_1$-$T_2$. The heat $Q_{23B}$ is absorbed by the low pressure process 416-415 in the heat pump cycle, which heat is rejected as $Q_{34}$ by the high pressure process 414-413 and transferred to the heat storage liquid in the temperature range $T_3$-$T_4$. The heat $Q_{23A}$ is absorbed directly by the heat storage liquid in the temperature range $T_2$-$T_3$. By doing so, an optimal heat absorption region $T_2$-$T_3$ for the working fluid in the combined Brayton heat engine and heat pump 410 can be chosen, and heat can be stored over a wide temperature region $T_1$-$T_4$. Any disadvantages associated with relatively high temperature solar energy collection (e.g., an expensive concentrating tracking collector) and/or with relatively low temperature solar energy collection (e.g., low thermodynamic efficiency) can be reduced, minimized or avoided, and a cheap storage liquid (e.g., water) can store more energy per kg than a salt mixture combined with a steam cycle with all its disadvantages (expense, solid-phase storage material [i.e., salt] at normal temperature, losses in steam cycle). In discharging mode, the trilateral cycle 430 (i.e., 431-432-433-434-431) is active, similar to the trilateral cycles 280 and 260 described in FIGS. 1 and 3. The system of FIG. 17 also shows that transferring solar heat from the solar collector 401 directly to the heat storage and retrieval subsystem 420 is not a requirement. In the charging mode, the Brayton cycle(s) 410 can receive the solar heat, and the heat storage and retrieval subsystem 420 functions as a heat sink for the Brayton cycle(s) 410.

Figure 18:
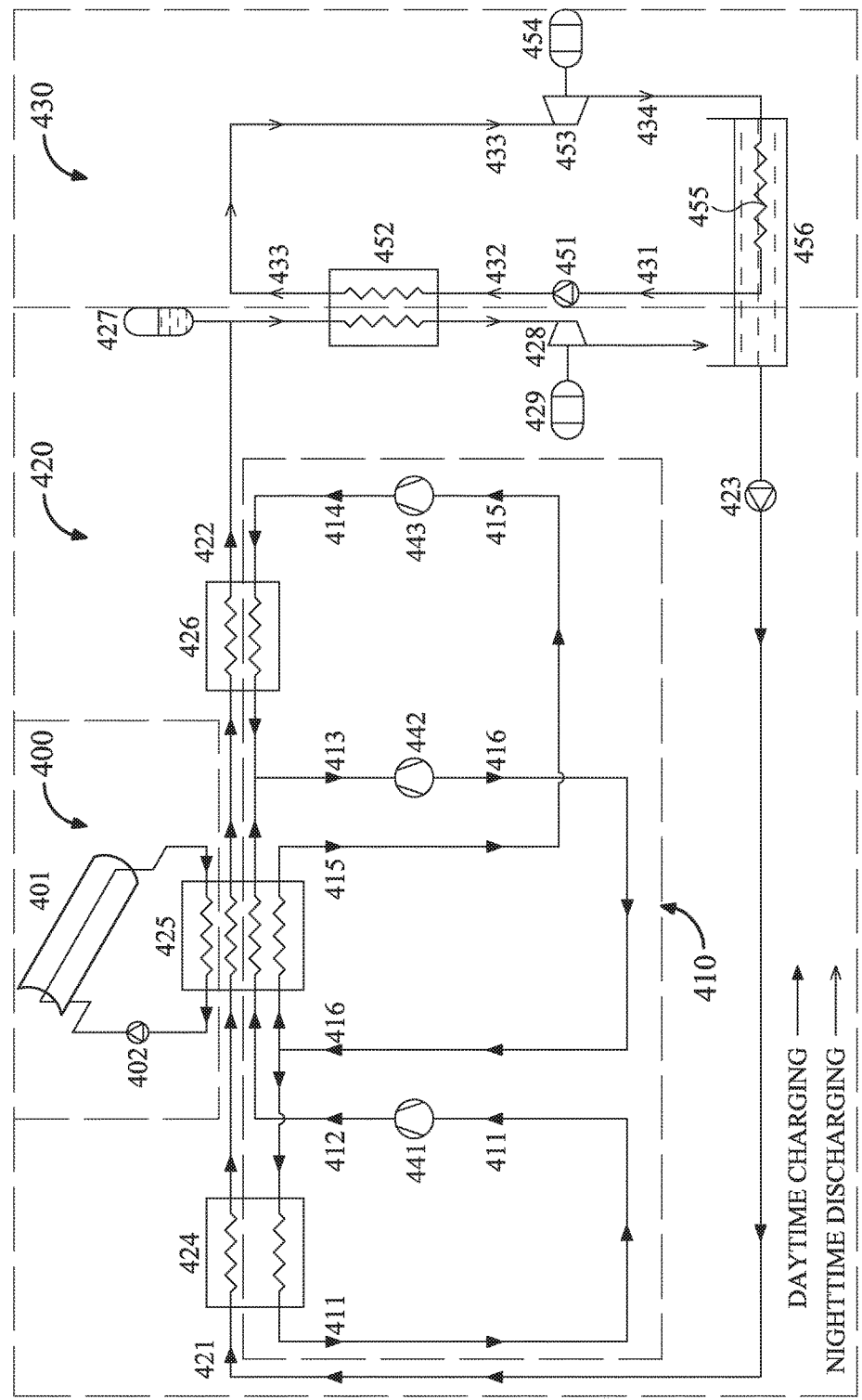
FIG. 18 is an outline of an exemplary thermal energy storage and retrieval system that implements the system depicted in FIG. 17.

FIG. 18 is an outline of the Brayton heat engine/heat pump cycles 410, the heat storage device 420 and the trilateral cycle 430 depicted in FIG. 17. In charging mode, the Brayton heat engine/heat pump cycles 410 constitute a heat engine-driven heat pump. The extended Brayton heat pump/heat engine 410 operates during daytime or sun hours in a charging mode, and heats up the heat storage liquid for storing in the tank 427 and/or for heating the trilateral heat engine 430. The devices 424, 425, 426, 452 and 455 are heat exchangers, 428, 442 and 453 are expanders, 441 and 443 are compressors, 402, 423 and 451 are pumps, 401 is a solar heat collector, 427 is a tank for storage of relatively hot heat storage liquid, and 456 is a tank, a pond or a lake for the relatively cold heat storage liquid.

In charging mode, the solar heat collector 401 transfers heat from the sun (via a supporting fluid pumped by the pump 402) to the heat exchanger 425 where the heat is distributed to the heat storage liquid and the Brayton working fluid within a relatively narrow temperature span or range. The working fluid in the combined Brayton cycle is divided into two sub cycles that supports the Brayton heat engine cycle and the Brayton heat pump cycle by having one expander 442 in common. After the expander 442 at 416 the working fluid divides into two streams or portions that supports each cycle. The first stream or portion supports the Brayton heat engine cycle, passes the heat exchanger 424 and transfers heat in the relatively low temperature range to the heat storage liquid at 416-411. At 411-412 the compressor 441 heats the working fluid first stream or portion before it enters the heat exchanger 425 at 412-413 where heat, coming from the solar collector 401, transfers to the working fluid. The first stream or portion of the working fluid then passes the expander 442 at 413-416 where energy releases and at 416 the Brayton heat engine sub cycle has completed one cycle.

At 416, the second stream or portion of the working fluid supporting the heat pump sub cycle enters the heat exchanger 425 where heat transfers from the solar collector 401 and at 416-415 heats up the second stream or portion of the working fluid. At 415-414 the stream or portion of the working fluid then further heats by the compressor 443 and in the heat exchanger 426 at 414-413 heat transfers to the heat storage liquid within a relatively high temperature. At 413 the first and the second streams or portions of the working fluid together enters the expander 442 where energy releases at 413-416 and at 416 the Brayton heat pump sub cycle is completed.

The Brayton extended cycle and working fluid has now distributed the heat from a narrow (but more optimal) temperature range in the heat exchanger 425 to a wide temperature range using the heat exchangers 424 and 426.

At the same time, the heat storage liquid is pumped from the tank, pond or lake by the pump 423 from 421 to 422 passing at least the heat exchangers 424, 425 and 426 with increased temperature. The heat storage liquid can be stored in the tank 427 and/or be used for heating the trilateral heat engine 430 simultaneously. By heating the working fluid in the heat engine 430 at the same time as the heat storage liquid being stored, one can obtain the ability to continuously retrieve energy from the heat storage and retrieval system 420 and produce electricity from the retrieved energy.

To power the heat engine 430, hot heat storage liquid passes through the heat exchanger 452, transferring the heat to the trilateral heat engine working fluid. Most of the remaining energy in the heat storage liquid is then released by a turbine 428 that may be connected to a generator 429 for electricity production. After heating in the heat exchanger 452, the working fluid in the trilateral heat engine 430 enters into the expander or turbine 453, releasing most of its energy before entering into the heat exchanger 455 where heat is rejected isothermally to the relatively cold heat storage liquid in the tank, pond or lake 456. The trilateral heat engine working fluid is thereby condensed, and now at 431, the pump 451 pumps the trilateral heat engine working fluid to 432 to enter the heat exchanger 452 to complete the cycle. The expander or turbine 453 is in this example connected to an electric generator 454 to produce electrical energy.

Figure 19:
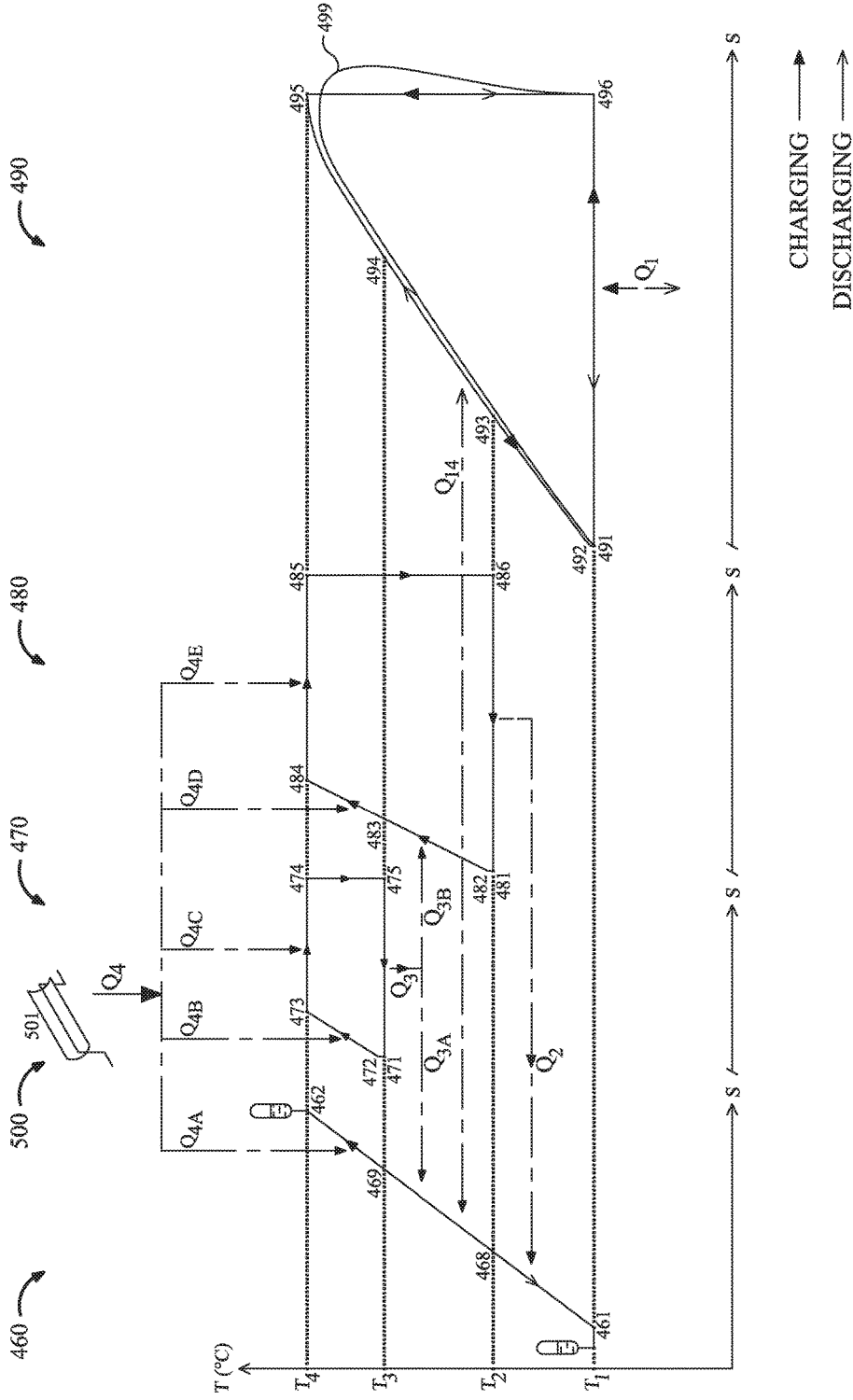
FIG. 19 is a TS diagram of another exemplary thermal energy storage and retrieval system in which solar heat is absorbed by a solar collector over a relatively high temperature range in accordance with one or more embodiments of the present invention.

FIG. 19 is a TS diagram of another embodiment. In charging mode, solar heat Q4 is absorbed by the solar collector 501 over a relatively narrow temperature range $T_3$-$T_4$. The heat Q4 is divided into 5 fractions or portions $Q_{4A}$, $Q_{4B}$, $Q_{4C}$, $Q_{4D}$ and $Q_{4E}$. The heat $Q_{4A}$ is absorbed by the heat storage liquid in the temperature range $T_3$-$T_4$, the heat $Q_{4B}$ is absorbed by a first Rankine heat engine cycle 470 in the high pressure process 472-473 in the temperature range $T_3$-$T_4$, the heat Q4C is absorbed by the first Rankine heat engine cycle 470 in the process 473-474 isothermally at $T_4$, the heat $Q_{4D}$ is absorbed by a second Rankine heat engine cycle in the high pressure process 483-484 in the temperature range $T_3$-$T_4$, and the heat $Q_{4E}$ is absorbed by the second Rankine heat engine cycle 480 in the process 484-485 isothermally at $T_4$. The first Rankine heat engine cycle 470 rejects the heat $Q_3$ isothermally in the low pressure process 475-471 at the temperature $T_3$ in a first fraction or portion $Q_{3A}$ to the heat storage liquid in the temperature range $T_2$-$T_3$ and in a second fraction $Q_{3B}$ to the high pressure heat absorbing process 482-483 in the second Rankine heat engine cycle 480. The second Rankine heat engine cycle rejects the heat $Q_2$ from the low pressure isothermal process 486-481 at a temperature $T_2$ and the heat storage liquid receives the heat in the temperature range $T_1$-$T_2$.

In a discharging mode, the trilateral heat engine cycle 490 and the heat storage sub system 460 operate. Heat from the heat storage sub system 460 in the temperature range $T_4$-$T_1$ is transferred at 462-461 to the high pressure process 492-493-494-495 of the trilateral heat engine 490. The trilateral heat engine cycle low pressure condensing process 496-491 rejects the heat $Q_1$ isothermally at a temperature $T_1$ to the environment in a warm climate or to indoors in a cold climate. 491-492 in the trilateral heat engine 490 is a pumping process.

In charging mode, the adiabatic expansion processes in the Rankine heat engines 474-475 and 485-486 respectively can be utilized for mechanical energy release, e.g. electricity production. In discharging mode, the adiabatic expansion process 495-496 can be used for mechanical energy release, e.g. electricity production.

Figure 20:
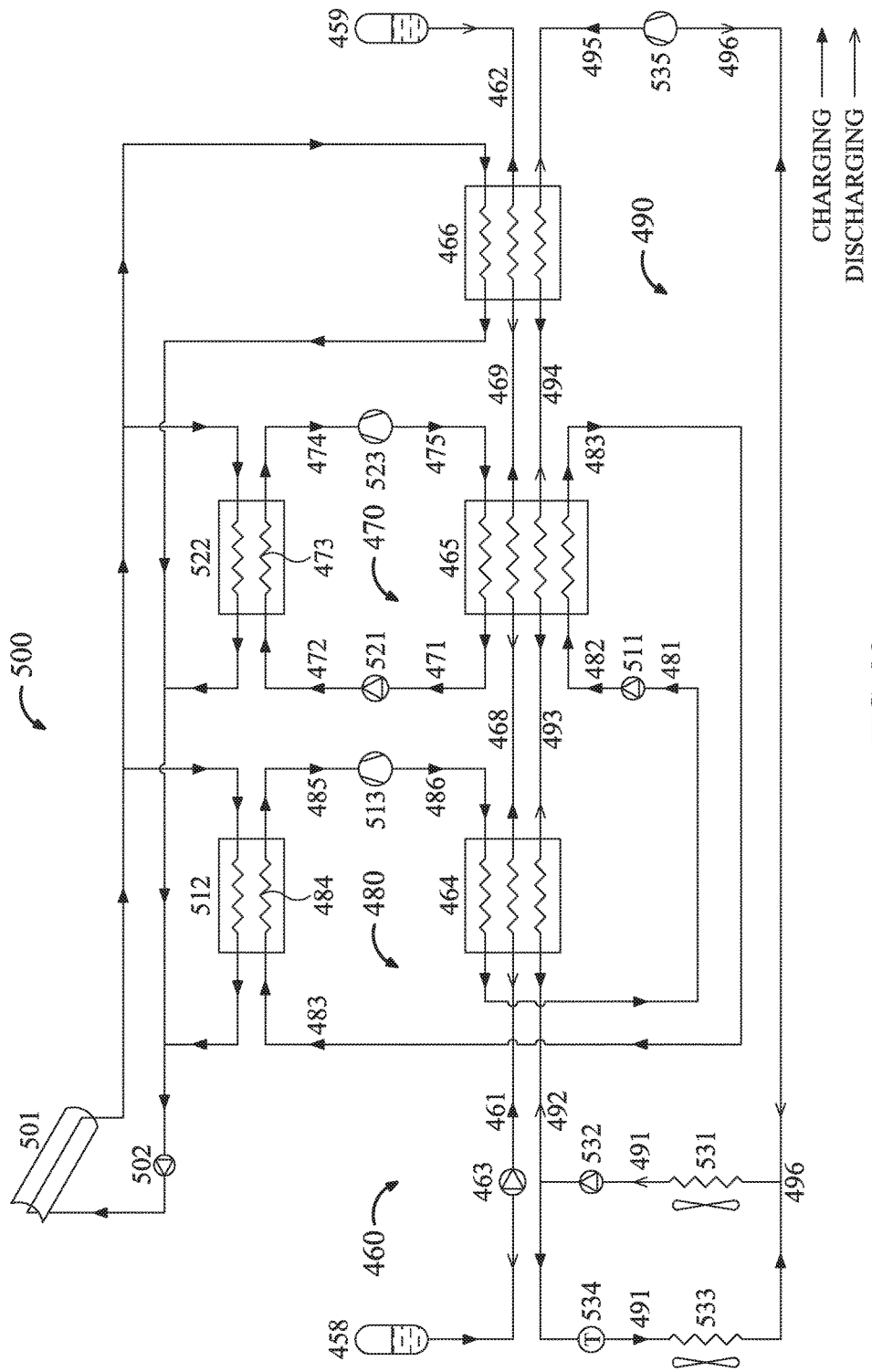
FIG. 20 is an outline of an exemplary thermal energy storage and retrieval system that implements the system depicted in the TS diagram of FIG. 19.

FIG. 20 is an outline of the Rankine cycles or heat engines 470 and 480, the heat storage device or subsystem 460, and the reversible trilateral cycle or heat pump/heat engine depicted in the TS diagram of FIG. 19. The Rankine heat engines 470 and 480 work together with the trilateral heat pump cycle 490 during the daytime or sun hours in a charging mode for heating up the heat storage liquid for storing in a tank 459. The devices 512, 522, 464, 465 and 466 are heat exchangers, 513, 523 and 534 are expanders, 535 is a compressor in a charging mode and an expander in a discharging mode, 502, 463, 511, 521, and 532 are pumps, 501 is a solar heat collector, 459 is a tank for storage of hot heat storage liquid, and 458 is a tank for cold heat storage liquid.

In charging mode, the solar heat collector 501 collects heat from the sun. The collected heat is transferred via the solar working fluid pumped by the pump 502 to the heat exchangers 512, 522 and 466. One part of the flow goes to the heat exchanger 512 where heat is transferred to the second Rankine heat engine 480, then a second part of the flow goes to the heat exchanger 522, where heat is transferred to the first Rankine heat engine 470 and a third part of the flow goes to heat exchanger 466 where heat is transferred to the heat storage liquid 469-462. At heat exchanger 522, the process 472-473 is a gradient heating of the working fluid in the first Rankine heat engine 470. At 473, the working fluid starts to evaporate until all the working fluid is in a gas phase at 474, where the energy is released in the expander 523. After the working fluid is condensed at 475-471 in the heat exchanger 465 (by transferring heat to the heat storage liquid at 468-469 and to the working fluid of the second Rankine heat engine 480 at 482-483), the cycle of the first Rankine heat engine 470 is completed by pumping the working fluid at 471 to 472 by the pump 521.

In the heat exchanger 512, a similar process occurs when the second Rankine working fluid enters into the heat exchanger at 483, is first heated at 483-484, then is evaporated at 484-485 and at 485-486 as gas releasing energy in the expander 513, passing through the heat exchanger 464 at 486-481, where heat is transferred to the heat storage liquid. The working fluid is condensed in the heat exchanger 464, pumped by pump 511, heated in the heat exchanger 465, and then passed through to the heat exchanger 512 to complete the cycle.

The trilateral cycle 490 works as a heat pump in the charging mode by moving heat from an environment such as a building at 491-496 in the heat exchanger 533. The working fluid in the trilateral heat pump evaporates in the heat exchanger 533, is compressed at 496-495 by the compressor 535, and from 495 to 492, the heat energy in the working fluid is transferred to the heat storage liquid by the heat exchangers 466, 465 and 464. The last step in the cycle for the working fluid at 492-491 is a turbine 534, where some energy will be released and may be used for driving a generator for electricity production as one example.

During the charging process, the pump 463 pumps the heat storage liquid from the cold heat storage tank 458, through the heat exchangers 464, 465 and 466 where the temperature of the heat storage liquid increases, to the hot heat storage tank 459. Some of the heat energy is transformed into mechanical power or electrical energy during the charging process by the expanders 513, 523 and 534.

In the discharging mode, the reversible trilateral cycle 490 operates as a heat engine and is powered by the heat in the stored heat storage liquid. The heat storage liquid flows from the hot tank 459 to the cold tank 458 by the reversible pump 463 or by the increased pressure in the hot heat storage tank 459 compared to the cold heat storage tank 458. The heat exchangers 464, 465 and 466 transfer heat from the heat storage liquid to the working fluid in the trilateral heat engine in the process steps 492-493-494-495. At 495-496, the evaporated working fluid in the trilateral heat engine 490 releases mechanical energy in the expander 535 that may be used for electricity production during the hours when the heat capacity from the sun is insufficient. At 496-491, the working fluid is condensed in the heat exchanger 531 by transferring heat to the surrounding indoor or outdoor environment, for example for pre-heating in an industrial process. The pump 532 completes the cycle at 491-492 in the trilateral heat engine.

The temperature $T_1$ in FIG. 19 is different in charging and discharging mode if cogeneration is used (e.g., for heating or cooling a building).

It is often a misconception that charging a gradient heat storage device with a trilateral cycle has a lower efficiency compared to a thermal cycle working with a high temperature isothermal heat storage process. Heat collection and heat storage doesn't need to be at the same temperature. Every thermodynamic cycle with all processes being reversible is, in theory, lossless. The complete cycle of heat storage efficiency depends mainly on second law losses. The gradient heat storage process is superior to a high temperature isothermal storage process in many ways. All tubes in salt-based heat storage machinery are typically heated at start up or during an interruption because of the high melting point of the salt. A system published and/or implemented by Abengoa uses 78 kg of molten salt for each 1 kWh of stored electricity. The cycle in FIG. 1 using 20 kg of water provides the same amount of stored electrical energy. Water is considerably less expensive than salt, and the cycle of FIG. 2 is more efficient than the Abengoa salt-based system, with less second law losses. However, heat collection optimally is conducted at a high temperature to obtain a relatively high W/m². When the cost of the utilized area is low, the thermodynamic efficiency is irrelevant because solar energy is substantially free. Only the investment cost per collected and stored kWh of electricity is important.

In some embodiments, an expander can also work as a compressor and vice versa (except compressors with check valves), with all intake ports switching to exhaust ports and vice versa. The designs of the cycles and layouts as shown are merely examples.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application. It is intended that the scope of the invention be defined by the claims appended hereto and their equivalents.

What is claimed is:

1. A solar energy collector and/or concentrator, comprising:
    an array of lenses configured to concentrate solar energy;
    a plurality of conduits through which a heat storage or heat transport fluid flows, the plurality of conduits hanging under the array of lenses and configured to move in at least first and second angular dimensions; and
    one or more heat transfer elements on each of the plurality of conduits, configured to receive the concentrated solar energy from at least some of the array of lenses and transfer the concentrated solar energy directly or indirectly to the heat storage or heat transport fluid.

2. The solar energy collector and/or concentrator of claim 1, wherein said lenses comprise Fresnel lenses.

3. The solar energy collector and/or concentrator of claim 2, wherein the array of lenses comprises a square-packed, rectangularly-packed or hexagonally-packed array of Fresnel lenses.

4. The solar energy collector and/or concentrator of claim 1, wherein each of said heat transfer elements comprises a material configured to convert UV, visible and/or IR light to thermal energy.

5. The solar energy collector and/or concentrator of claim 4, further comprising a thermally conductive material between each of said heat transfer elements and a corresponding one of the plurality of conduits.

6. The solar energy collector and/or concentrator of claim 1, further comprising a plurality of posts supporting the array of lenses, and a plurality of wires or cables suspended directly or indirectly from the posts and/or the lenses, the plurality of wires or cables directly or indirectly supporting the plurality of conduits.

7. The solar energy collector and/or concentrator of claim 6, further comprising a plurality of beams or rails supporting the plurality of conduits, wherein the plurality of wires or cables are connected to the plurality of beams or rails.

8. The solar energy collector and/or concentrator of claim 7, further comprising at least one mechanism configured to move the plurality of conduits and/or the plurality of beams or rails in the first and second angular dimensions.

9. The solar energy collector and/or concentrator of claim 8, wherein the mechanism comprises at least one first motor configured to move the plurality of conduits and/or the plurality of beams or rails in the first angular dimension and at least one second motor configured to move the plurality of conduits and/or the plurality of beams or rails in the second angular dimensions.

10. The solar energy collector and/or concentrator of claim 8, wherein when the sun has a position exposing the array of lenses to the solar energy, the at least one mechanism is configured to position the plurality of conduits and/or the plurality of beams or rails corresponding to the position of the sun so that the heat transfer elements continuously receive the concentrated solar energy from the array of lenses.

11. The solar energy collector and/or concentrator of claim 1, wherein the heat transfer elements are spaced apart by a distance greater than a length of each heat transfer element.

12. The solar energy collector and/or concentrator of claim 1, further comprising a distributing pipe or tube feeding the heat storage or heat transport fluid to each of the plurality of conduits, and a collection pipe or tube receiving the heat storage or heat transport fluid from each of the plurality of conduits.

13. A thermal energy storage and retrieval system, comprising:
  a solar energy collector and/or concentrator comprising:
    an array of lenses configured to concentrate solar energy,
    a plurality of conduits through which a heat storage or heat transport fluid flows, the plurality of conduits hanging under the array of lenses and configured to move in at least first and second angular dimensions, and
    one or more heat transfer elements on each of the plurality of conduits, configured to receive the concentrated solar energy from at least some of the array of lenses and transfer the concentrated solar energy directly or indirectly to the heat storage or heat transport fluid;
  one or more thermodynamic cycles configured to exchange heat in each of a relatively low-pressure process and a relatively high-pressure process; and
  a heat storage and retrieval subsystem configured to exchange heat with at least a first one of the one or more thermodynamic cycles in at least one of a charging operation and a discharging operation,
  wherein the solar energy collector and/or concentrator is configured to collect, concentrate and/or transfer solar heat to at least one of (i) the heat storage and retrieval subsystem and (ii) at least a second one of the one or more thermodynamic cycles during the charging operation, the second one(s) of the one or more thermodynamic cycles being the same as or different from the first one(s) of the one or more thermodynamic cycles.

14. The thermal energy storage and retrieval system of claim 13, wherein the solar energy collector and/or concentrator rejects heat to the heat storage and retrieval subsystem during the charging operation, the heat storage and retrieval subsystem rejects heat to the first one(s) of the one or more thermodynamic cycles during the discharging operation, the second one(s) of the one or more thermodynamic cycles rejects heat to the heat storage and retrieval subsystem during the charging operation, and the first and second one(s) of the one or more thermodynamic cycles are different.

15. The thermal energy storage and retrieval system of claim 14, wherein the solar energy collector and/or concentrator rejects heat to at least one of the second one(s) of the one or more thermodynamic cycles during the charging operation, and the second one(s) of the one or more thermodynamic cycles comprise a plurality of second thermodynamic cycles that reject heat to the heat storage and retrieval subsystem over different (but optionally overlapping) temperature ranges during the charging operation.

16. A method of collecting and/or concentrating solar energy, comprising:
  focusing the solar energy with an array of lenses on one or more heat transfer elements on each of a plurality of conduits hanging under the array of lenses;
  transferring the solar energy directly or indirectly from the heat transfer elements to a heat storage or heat transport fluid in the plurality of conduits;
  passing or flowing the heat storage or heat transport fluid through the plurality of conduits; and
  moving the plurality of conduits in at least first and second angular dimensions to continuously focus the solar energy from the array of lenses on the heat transfer elements.

17. The method of claim 16, wherein said lenses comprise Fresnel lenses.

18. A method of storing thermal energy, comprising:
  collecting and optionally concentrating solar energy using a solar energy collector and/or concentrator comprising:
    an array of lenses configured to concentrate solar energy,
    a plurality of conduits through which a heat storage or heat transport fluid flows, the plurality of conduits hanging under the array of lenses and configured to move in at least first and second angular dimensions, and
    one or more heat transfer elements on each of the plurality of conduits, configured to receive the concentrated solar energy from at least some of the array of lenses and transfer the concentrated solar energy directly or indirectly to the heat storage or heat transport fluid;
  rejecting heat from the heat storage or heat transport fluid to at least one of (i) a heat storage and retrieval subsystem and (ii) one or more thermodynamic cycles, and
  pumping a heat storage medium from a cold storage vessel or reservoir to a hot storage vessel or reservoir through one or more heat storage conduits.

19. The method of claim 18, wherein the one or more heat storage conduits pass through one or more heat exchangers configured to exchange heat with the heat storage or heat transport fluid and/or a working fluid in a first one of the one or more thermodynamic cycles.

20. The method of claim 18, wherein said lenses comprise Fresnel lenses.

* * * * *